United States Patent
Ferlin et al.

(10) Patent No.: US 7,819,157 B2
(45) Date of Patent: Oct. 26, 2010

(54) TIRE BEAD STRUCTURE

(75) Inventors: Olivier Ferlin, Malauzat (FR); Bopha Grisin, Loubeyrat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 641 days.

(21) Appl. No.: 11/885,977

(22) PCT Filed: Mar. 3, 2006

(86) PCT No.: PCT/EP2006/060456
§ 371 (c)(1),
(2), (4) Date: Sep. 7, 2007

(87) PCT Pub. No.: WO2006/094947
PCT Pub. Date: Sep. 14, 2006

(65) Prior Publication Data
US 2008/0190539 A1 Aug. 14, 2008

(30) Foreign Application Priority Data
Mar. 7, 2005 (FR) .................................. 05 02287

(51) Int. Cl.
*B60C 15/06* (2006.01)
*B29D 30/32* (2006.01)

(52) U.S. Cl. ..................... 152/543; 152/546; 152/550; 152/552; 152/554; 156/132; 156/135

(58) Field of Classification Search ......... 152/539–543, 152/546, 550, 552, 554; 156/123, 132, 133, 156/135
See application file for complete search history.

(56) References Cited

U.S. PATENT DOCUMENTS

| 3,825,052 A | * | 7/1974 | Matsuyama et al. | ......... 152/454 |
| 3,946,785 A | | 3/1976 | Powers et al. | |
| 4,100,955 A | * | 7/1978 | Pottinger et al. | ............ 152/541 |
| 6,408,914 B1 | | 6/2002 | Lamock et al. | |
| 2002/0195186 A1 | | 12/2002 | Takagi | |

FOREIGN PATENT DOCUMENTS

| EP | 1 174 289 | | 1/2002 |
| EP | 1 310 385 | | 5/2003 |
| JP | 2004-345593 A | * | 12/2004 |

* cited by examiner

*Primary Examiner*—Geoffrey L Knable
(74) *Attorney, Agent, or Firm*—Cohen Pontani Lieberman & Pavane LLP

(57) ABSTRACT

A tire comprising sidewalls joining a crown part to beads that are intended to come into contact with a mounting rim, these sidewalls comprising a carcass reinforcement anchored in each bead to at least one bead wire and having an end in each bead, the bead wire having, seen in meridian cross-section, an outer profile comprising two profile parts, a first part radially to the inside of axial width L, extending between an axially innermost point and an axially outermost part, and a second part radially to the outside between said points. Each bead comprises at least one additional coupling reinforcement in contact with the carcass reinforcement. In each bead and seen in meridian cross-section: the carcass reinforcement is partially wrapped around the bead wire and is such that its end lies axially between the end points of the radially internal profile part of the bead wire; and the additional coupling reinforcement extends the carcass reinforcement so as to be at least partly wrapped around the bead wire, that is to say so as to partly cover at least the radially external profile part of said bead wire.

12 Claims, 3 Drawing Sheets

TIRE BEAD STRUCTURE

RELATED APPLICATION

This is a U.S. National Phase Application under 35 USC 371 of International Application PCT/EP2006/060456, filed on Mar. 3, 2006.

FIELD OF THE INVENTION

The invention relates to tires for vehicles carrying heavy loads and more particularly to the reinforcement structure of such tires.

BACKGROUND OF THE INVENTION

As is known, a tire comprises a tread surmounting a crown part exhibiting circumferential stiffness and transverse stiffness, this crown partly surmounting a carcass reinforcement. This carcass reinforcement comprises a plurality of metal reinforcing members placed in a radial orientation (that is to say making an angle of at least 80° to the circumferential direction in the tire). Furthermore, the tire includes beads intended to come into contact with rim seats, these beads comprising at least one reinforcing member in the circumferential direction (such as for example a bead wire). One way of linking the carcass reinforcement to the bead wire consists in at least partly wrapping said reinforcement around the bead wire, forming an upturn extending to some height into the sidewall. This connecting method may lead, under use conditions, to the appearance of debonding between the upturn and the rubber-based materials surrounding said upturn.

In the case of a tire of high loading capacity, it is often necessary for the carcass reinforcement to have, as reinforcing members, cables formed from a plurality of metal threads, these cables exhibiting, either because of the diameter of each thread or because of the structure of the cabling, or both these factors, a very high flexural stiffness. This flexural stiffness may lead to difficulties in manufacturing the tire, especially when having to anchor the carcass reinforcement onto the bead wire while forming an upturn. These difficulties are essentially due to the excessively high flexural stiffness of the reinforcing members, involving the application of large forces in order to turn the carcass reinforcement up around each bead wire. These difficulties are further exacerbated whenever the length of the carcass reinforcement upturn is too short and the bonding forces in the uncured state of the unvulcanized materials are not sufficient to keep said upturn in place throughout all the manufacturing phases up to the molding of the tire.

SUMMARY OF THE INVENTION

One object of the invention is to provide a tire in which the structure of the beads is easier to manufacture, while still being satisfactory from the endurance standpoint.

This and other objects are attained in accordance with one aspect of the invention directed to a tire comprising sidewalls joining a crown part to beads that are intended to come into contact with a mounting rim, these sidewalls comprising a carcass reinforcement formed from a plurality of reinforcing members placed at an angle of at least 70° to the circumferential direction, this carcass reinforcement being anchored in each bead to at least one bead wire and having an end A in each bead, the bead wire exhibiting essentially circumferential extensional rigidity and, seen in meridian cross-section, an outer profile comprising two profile parts, a first part radially to the inside of axial width L, extending between an axially innermost point B2 and an axially outermost point B1, and a second part radially to the outside between said points B1 and B2, this bead wire being covered with at least one profiled element made of rubber compound in order to provide a mechanical link with the carcass reinforcement. Moreover this carcass reinforcement is partly wrapped only around the bead wire going axially outward from the inside of the tire, so as to have an end of said reinforcement located axially between the points B1 and B2 and radially to the inside of the radially internal first profile part of the bead wire. Each bead comprises at least one additional coupling reinforcement in contact over a length D with the carcass reinforcement, said length D being measured starting from the end A of the carcass reinforcement lying radially to the inside of the first profile part of the bead wire.

Seen in meridian cross-section, each bead of this tire is such that the additional coupling reinforcement extends the carcass reinforcement so as to be at least partly wrapped around the bead wire, that is to say so as to at least partially cover the second part of the radially external profile of the bead wire between said points B1 and B2, said additional coupling reinforcement having a trace such that the tangent to this trace, at a point K on said reinforcement, makes an angle of less than 45° to a straight line parallel to the axis of rotation. This point K is determined as the point of intersection between the trace of the additional reinforcement and a straight line passing through the radially outermost point of the bead wire profile, this line being perpendicular to the axis of rotation.

In practice, the point K is taken on the profiled element of rubber compound against which the additional reinforcement presses. When the bead wire comprises, on its second profile part, a plurality of points all at the same distance from the axis of rotation, the axially outermost point is chosen.

The expression "seen in meridian cross-section" is understood to mean that the bead or the tire is seen in a sectional plane containing the axis of rotation of said tire.

Preferably, the coupling length D between the additional reinforcement and the carcass reinforcement is at least equal to the axial distance L separating the points B1 and B2 of the bead wire.

Preferably, the axial distance L separating the points B1 and B2 of the bead wire is at least equal to twice the height of said bead wire measured in the radial direction, so that the anchoring of the carcass reinforcement is further improved, the increase in mechanical coupling length between this reinforcement and the bead wire being favorable to the endurance of the beads. The height of the bead wire corresponds to the maximum distance between two points on the outline of the bead wire (seen in meridian cross-section) that are radially furthest apart, said points being taken on the same straight line perpendicular to the axis of rotation.

The angular range of the tangent at the point K on the additional coupling reinforcement is chosen so as to increase the mechanical retention of the reinforcements around the bead wire and at the same time to substantially reduce the consequences of the flexural cycles undergone by the bead during running (especially the stress concentrations at the ends of said reinforcements). Preferably, this angle is less than 30°.

Furthermore, the bonding of the end of the additional reinforcement to the profiled element surrounding the bead wire ensures better mechanical retention. This retention is further increased by providing, in addition to pressing against the bead wire, for the end of the additional reinforcement to be coupled to the carcass reinforcement so that this end follows the movements of the carcass and does not pass into compression in the flexural cycles undergone by the bead during running.

A beneficial effect on the endurance of the tire beads according to the invention is obtained when the length of the base of the bead wire is at least equal to one half of the width of the rim seat onto which said tire is intended to be fitted. The specific dimensions of the mounting rims for a heavy goods vehicle tire are given in standardization documents (from ETRTO (The European Tyre and Rim Organization) or TRA (Tire and Rim Association) for example).

For tires subjected to large loads, it is advantageous to combine both a carcass reinforcement formed from a plurality of metal reinforcing members, each reinforcing member being formed from at least one thread with a diameter of 0.15 mm or higher, with a flexible more compliant coupling reinforcement, that is to say one formed by at least one ply comprising a plurality of reinforcing members chosen in particular from the following reinforcing members: metal thread with a diameter of less than 0.15 mm; textile or aramid thread.

In one embodiment of the invention, the reinforcing members of the coupling reinforcement make an angle close to 90° to the circumferential direction, that is to say an angle of at least 70°.

In another embodiment, the additional reinforcement, extending the carcass reinforcement so as to anchor it onto the bead wire, consists of a fabric of crossed reinforcing members. Likewise, the warp or weft reinforcing members of this fabric may or may not be oriented in the same way as the reinforcing members of the carcass reinforcement. As regards the choice of this fabric, it is of course essential for it to have an appropriate flexural compliance in order to allow it to be turned up around a bead wire.

The coupling reinforcement may be composed of one or more reinforcing plies, which plies may or may not be identical. Moreover, the coupling reinforcement may be entirely placed on one side relative to the carcass reinforcement (for example between the bead wire and said carcass reinforcement) or else placed on each side.

Advantageously, at least one bead of a tire according to the invention further includes at least one complementary stiffening reinforcement, this complementary reinforcement comprising a plurality of reinforcing members making an angle different from 90° to the circumferential direction. Preferably, this complementary reinforcement is placed axially to the inside of the carcass reinforcement (i.e. toward the inflating cavity of the tire) and axially to the inside of the bead wire.

To increase the stiffening effect in the circumferential direction, it is advantageous that the angle of the reinforcing members of the complementary stiffening reinforcement be close to 0° i.e. at most equal to 10°, to the circumferential direction.

To further improve the manufacture of a tire bead according to the invention and the anchoring of the metal carcass reinforcement, it is advantageous to combine any one of the provisions described above with the presence of a permanent deformation of the reinforcing members of said reinforcement, this deformation being located at the axially innermost point of said bead wire.

Another aspect of the invention is directed to a process for manufacturing a tire having a carcass reinforcement comprising a plurality of radially oriented reinforcing members, the ends of which are anchored in each bead to a bead wire essentially exhibiting circumferential extensional rigidity and having, seen in meridian cross-section, a profile comprising two profile parts, a first part radially to the inside of axial width L, extending between an axially innermost point B2 on the outline of the bead wire and an axially outermost point B1 on the same outline, and a second part radially to the outside between said points B1 and B2. Furthermore, each bead includes at least one additional coupling reinforcement having ends N1 and N2, this additional coupling reinforcement being in contact over a length D with the carcass reinforcement, said length D being measured starting from the end A of the carcass reinforcement.

The process according to this aspect of the invention comprises the following steps:

two coupling reinforcements axially spaced apart are placed on a manufacturing drum, these reinforcements being of appropriate bending stiffness so as to allow them to be turned up around a bead wire core;

a carcass reinforcement is deposited on the same manufacturing drum, so that each end of said carcass reinforcement partly covers each of the coupling reinforcements;

a bead wire core is positioned in each bead, said core being formed from a bead wire covered in a rubber-based material, concentrically with respect to the manufacturing drum and radially to the outside of each end of the carcass reinforcement, so that each of the ends of this reinforcement lies axially between the points B1, B2 of the radially internal profile part of the bead wire;

each of the coupling reinforcements is turned up around the bead wire so that each coupling reinforcement end lies between the points B1, B2 of the radially external profile part of the bead wire;

the process continues in the usual manner for manufacturing the tire, by converting the cylindrical shape of the drum into a toroidal shape and then by placing the other components of the tire thereon in order to form a tire blank; and this tire blank is molded and vulcanized.

The first two steps of the process described may be carried out in the order described or, equivalently, in the reverse order.

Other features and advantages of the invention will become apparent from the description given below with reference to the appended drawings which show, by way of non-limiting examples, embodiments of the subject matter of the invention.

DETAILED DESCRIPTION OF THE DRAWINGS

In the description of the figures, and in order to make them easier to examine, the same references will be used whenever they denote similar elements, irrespective of their structure or their function.

Figure 1:
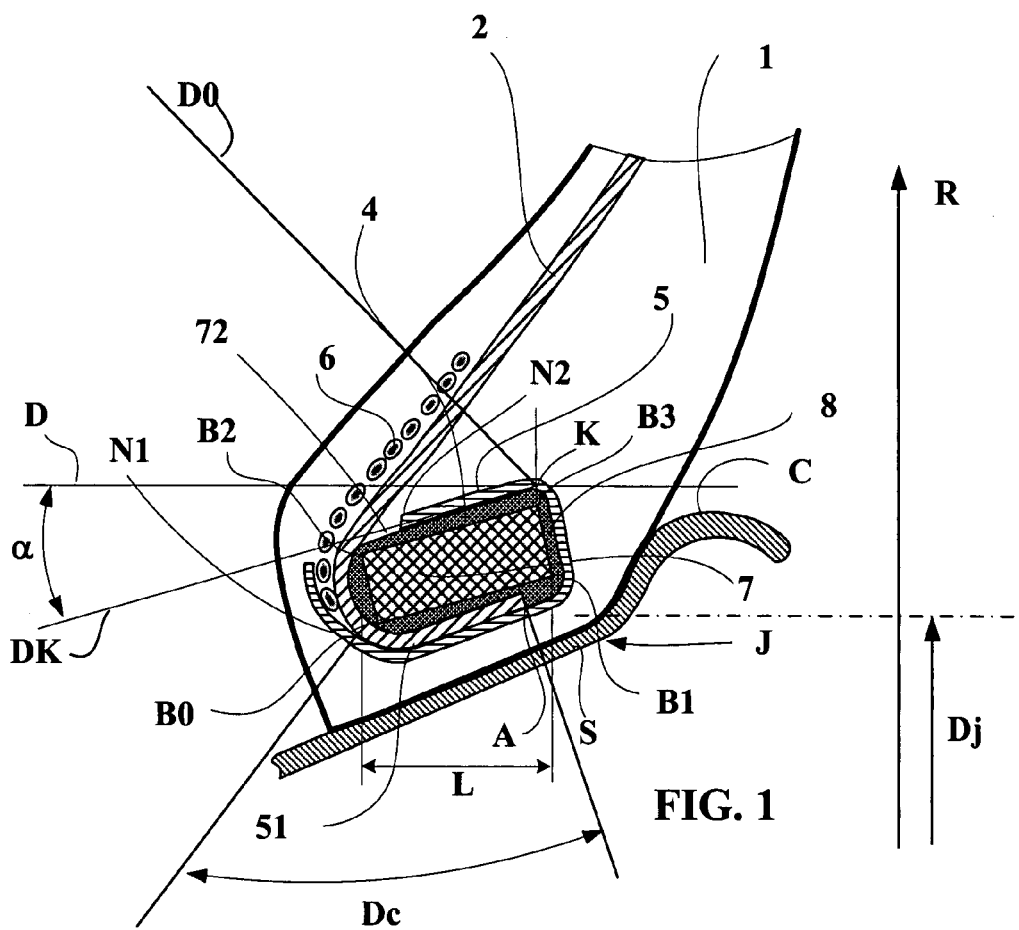
FIG. 1 shows a tire bead according to a first embodiment of the invention.

FIG. 1 shows a bead 1 of a tire according to a first embodiment of the invention. Each bead 1 of this 315/60 R 22.5 tire comprises a reinforcement in the form of a metal bead wire 7 formed from a plurality of circumferentially wound threads, said bead wire being of substantially rectangular cross-section having four vertices B0, B1, B2 and B3 defining four sides. The points B0 and B1 are located on the side radially to the inside of the cross-section of the bead wire, whereas the points B2 and B3 are located on the side radially to the outside. The vertex B0 is the radially innermost point (i.e. closest to the axis of rotation), while the point B3 is the radially outermost point. This bead wire 7 has, in the present case, an axial width L, measured between the axially furthest apart points B1 and B2 of this base, equal to 20 mm. The height of this bead wire i.e. the maximum radial dimension between points of the same cross-section measured in a direction R perpendicular to the axis of rotation of the tire, is here equal to 8 mm and corresponds substantially to the distance between the points B0 and B2. The bead wire 7 is covered in a profiled element 4 made of a rubber compound in order to form a bead wire core 8 having a radially external face substantially parallel to the radially external face of the bead wire 7 (between the points B2 and B3).

The tire includes a carcass reinforcement 2 formed by a ply of radial metal reinforcing members (cables each formed by an assembly of 19 threads of 18/100 mm diameter), that is to say oriented so as to make an angle close to or equal to 90° to the circumferential direction. This carcass reinforcement 2 is partially wrapped around the bead wire core 8 so as to be turned up around said bead wire core while passing axially from the inside toward the outside as far as an end point A which lies radially beneath the base of the bead wire (that is to say between the points B0 and B1) and close to the point B1 (axially further to the outside than B0).

Furthermore, an additional coupling reinforcement 5 is mechanically coupled to the carcass reinforcement 2 over a part 51 of length D between an end point N1 of the additional reinforcement and the end A of the carcass reinforcement 2. The additional coupling reinforcement 5 is formed by a ply of rubber compound reinforced by aramid (110×2) reinforcing members placed so as to make substantially an angle of 90° to the circumferential direction (these reinforcing members are oriented in the tire in the same way as the reinforcing members of the carcass). Owing to their nature, the reinforcing members of the coupling reinforcement 5 have properties suitable for being easily turned up around the bead wire and pressed against the radially external face 81 of the bead wire core 8 over more than half of the axial length of this face 81 as far as an end point N2.

To avoid any stress concentration at the end of the additional reinforcement due to flexural or shear movements of said end, the end part of the additional coupling reinforcement 5 is pressed against the radially external profile of the bead wire 7 between the points B2 and B3, this additional coupling reinforcement 5 being entirely located radially to the inside of a straight line parallel to the axis of rotation and passing through a point K on said reinforcement, this point K being obtained as the point of intersection of the additional reinforcement with a plane perpendicular to the axis of rotation passing through the radially outermost point B3 of the profile of the bead wire 7. At the point K, the tangent DK to the profile of the additional reinforcement makes an angle α to a straight line D parallel to the axis of rotation, said angle α being around 30°. This straight line DK does not pass into the sector bounded by the straight line D and, by a straight line D0 oriented at 45° to the straight line D parallel to the axis of rotation. The angle that the tangent DK makes with the straight line D0 is 75°.

The coupling reinforcement 5 is, in the region radially to the inside of the base of the bead wire, located radially to the inside of the carcass reinforcement in the case presented here and is extended axially to the outside of the bead wire so as thereafter to follow the profile of the profiled element 4 covering the bead wire 7. This additional coupling reinforcement 5 is coupled to the carcass reinforcement 2 over a curved length D substantially equal to 40 mm. In an embodiment not shown, the additional reinforcement may, in the region radially to the inside of the base of the bead wire, be located radially to the outside of the carcass reinforcement.

The bead 1 that has just been described is shown in FIG. 1 as it is when fitted to a mounting rim J of diameter Dj equal to 22.5 inches (571.5 mm) and comprising a seat S extended axially to the outside by a flange C of circular shape. The seat S of this rim is inclined at an angle of 15° to the axis of rotation and has a width substantially equal to 32 mm. The angle of inclination of the base of the bead wire 7 between the points B0 and B1 is substantially equal to the angle of inclination of the rim seat.

The bead 1 further includes an additional reinforcement 6 axially to the inside of the carcass reinforcement (i.e. in the internal cavity side of the tire), this additional reinforcement 6 being formed from a plurality of metal reinforcing members consisting of eleven threads of 0.35 mm diameter. In the present case, these reinforcing members are said to be "fractionated", that is to say they are placed circumferentially (at a zero angle to this circumferential direction) and their length is less than the perimeter of the circle of diameter DJ equal to the nominal diameter of the mounting rim. These fractionated reinforcing members therefore do not make a complete turn. The radially innermost end of this additional reinforcement 6 is placed axially between the additional coupling reinforcement 5 and the carcass reinforcement 2.

It has also been found that the mechanical retention performance of the bead carcass according to the invention can be improved when the width of the base of the bead wire is at least equal to 50% of the width of the rim seat of the tire. In the case of a 22.5 inch (571.5 mm) diameter rim, a bead wire width greater than 16 mm in combination with a structure according to the invention appreciably improves the endurance performance of the beads.

The endurance performance of tires according to the invention is, in comparison with standard tires of the same dimensions, on average 1.5 times better than that of tires of the same dimensions currently on the market (same carcass reinforcement anchored by wrapping around a bead wire and forming an upturn part extending radially into the sidewall of the tire).

Figure 2:
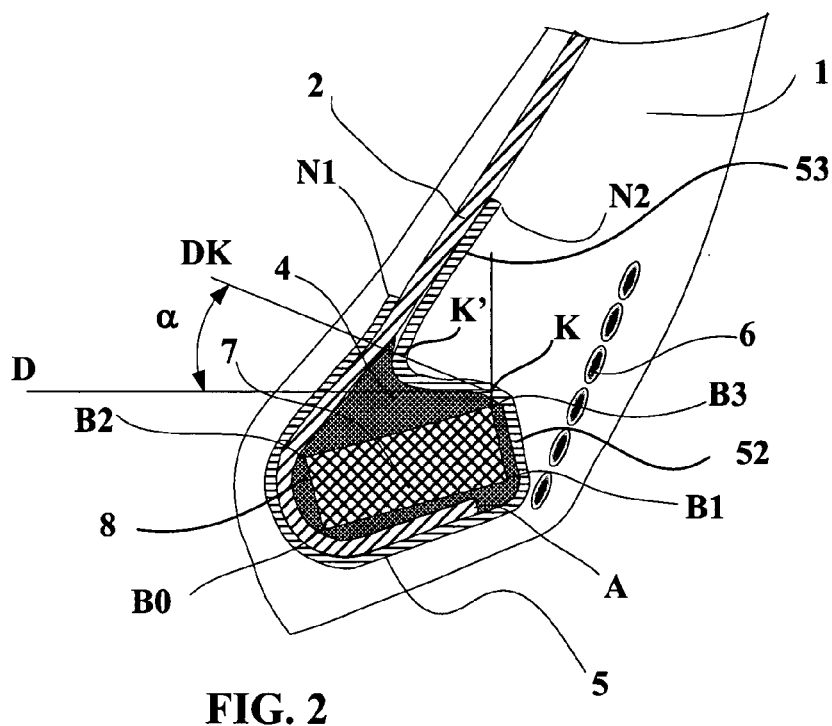
FIG. 2 shows a second embodiment of a bead according to the invention.

FIG. 2 shows another embodiment of the invention. In this embodiment, the additional coupling reinforcement 5 partly follows the outline of a profiled element 4 surrounding a bead wire 7 identical to that employed in the embodiment described with the support of FIG. 1, said profiled element 4 having a cross-section extending radially toward the outside of the bead wire 7 and forming, seen in meridian cross-section, a kind of triangle 41, one of the bases of which rests on the radially external face of the bead wire 7.

The additional coupling reinforcement 5 is mechanically coupled to the carcass reinforcement axially to the inside of said carcass reinforcement (it is therefore not between the carcass and the bead wire) and then radially to the inside as far as the end point A of the carcass reinforcement. This coupling reinforcement 5 is extended beyond the point A by a part 52 in contact with the bead wire core 71, which core is extended by a part 53 in contact with the carcass reinforcement so as to terminate at a point N2. In the case shown, the point N2 is offset radially to the outside relative to the point N1 so as to avoid any stress concentration.

The coupling reinforcement 5 is formed here from a textile fabric, the weft and warp threads of which are oriented at substantially 45° to the radial reinforcing members of the carcass reinforcement 2.

In this embodiment, the tangent DK to the point K of the additional reinforcement makes an angle alpha ($\alpha$) to a straight line D parallel to the axis of rotation of about 20° (the half-line DK starting from the point K and directed toward the inside of the tire being located radially to the outside of the half-line parallel to the axis of rotation and also passing through the point K).

To increase the mechanical locking of the additional coupling reinforcement 5 to the bead wire, it is advantageous, as will be shown in this embodiment, for the tangent DK to cut the additional reinforcement at another point, denoted by K'. The smaller the minimum radius of curvature between the points K and K' of the additional reinforcement 5, the better the locking.

In this embodiment (FIG. 2), a complementary stiffening reinforcement 6 is positioned axially to the outside of the bead wire core 71. This complementary reinforcement 6 comprises a plurality of mutually parallel reinforcing members making an angle of between 15° and 35° to the circumferential direction.

Figure 3:
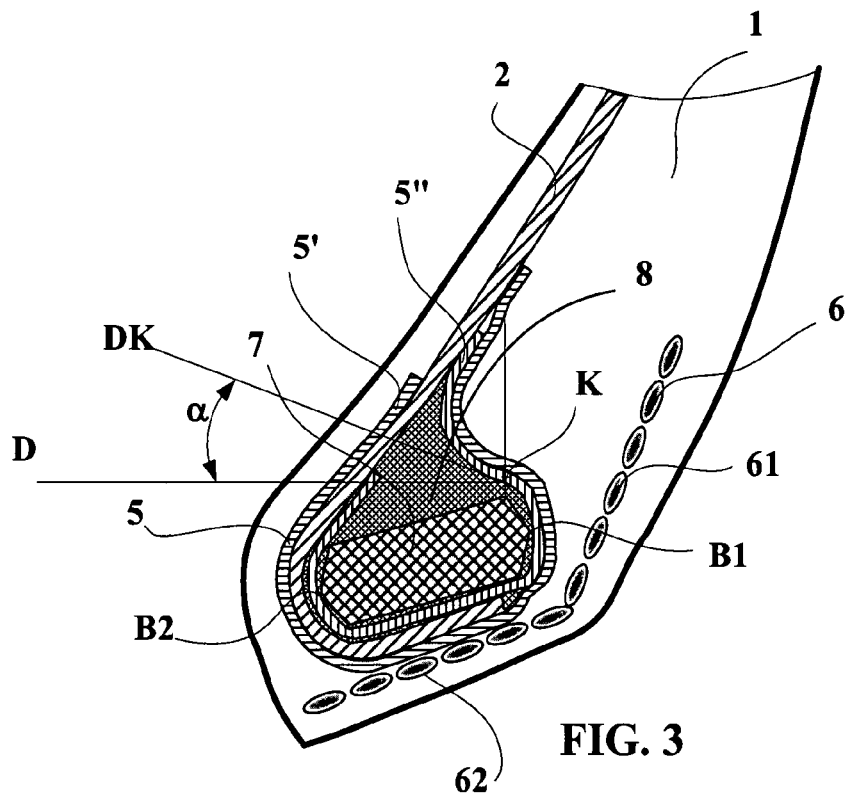
FIG. 3 shows a third embodiment of a bead according to the invention.

In a third embodiment of the invention, shown in FIG. 3, the bead 1 comprises a bead wire 7 of substantially hexagonal shape, the six sides of the outline of this bead wire being of unequal lengths. The maximum axial width L is taken between the axially furthest apart points B1 and B2, which correspond here to two of the vertices of the hexagonal shape. In this embodiment, the carcass reinforcement 2 is identical to those of the previous embodiments; the coupling reinforcement 5 here comprises two coupling plies 5' and 5'' of unequal lengths, the ends of which are offset with respect to one another.

The coupling of this coupling reinforcement 5 to the carcass reinforcement is achieved by placing a first ply 5' so that it is radially to the inside of the carcass reinforcement in the partially turned-up part of said carcass and a second ply 5'' so that it is radially to the outside of the carcass reinforcement in the partially turned-up part of said carcass. The partially turned-up part of the carcass corresponds to the end of the carcass reinforcement lying radially to the inside of the bead wire 7.

This third embodiment furthermore includes (this also being possible in the other embodiments) an additional reinforcement 6 having a part 61 axially to the outside of the bead wire 7 and a part 62 radially to the inside of said bead wire. This reinforcement is formed here from metal reinforcing members preferably making an angle of between 15° and 35° to the circumferential direction.

Figure 5:
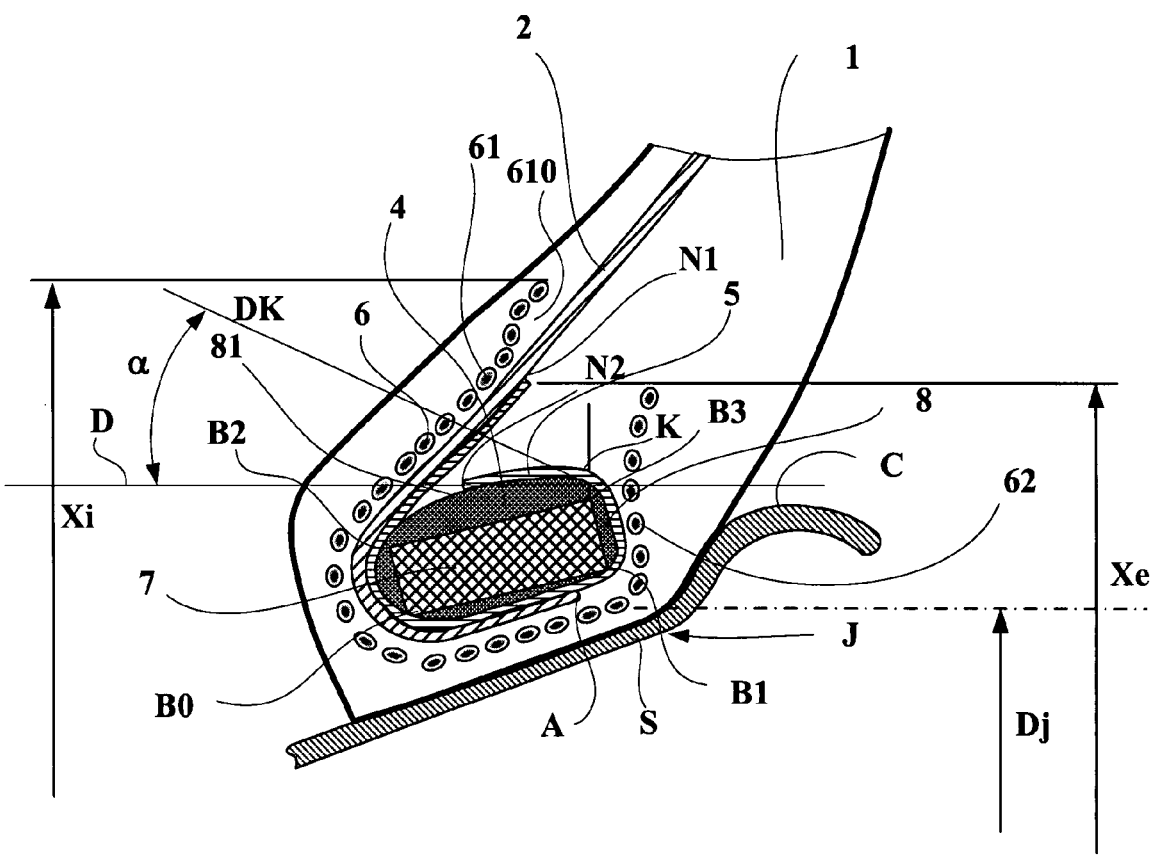
FIG. 5 shows another embodiment of a bead according to the invention.

Another embodiment of a bead according to the invention is shown in FIG. 5. This embodiment differs from the embodiment of FIG. 1 in that the carcass 2 is extended by an additional coupling reinforcement 5 passing radially between said carcass 2 and the bead wire 7 in the region radially beneath the bead wire. Moreover, this additional reinforcement 5 has a first end N1 located against the carcass radially beyond the bead wire and its covering 71 of rubber material. The role of this covering is, apart from mechanical linkage, to provide a stiffness transition between the metal bead wire and the rubber materials making up the various (carcass and additional) reinforcements.

The additional reinforcement 5 extends the carcass beyond the end A of said carcass, this end A being located beneath the radially internal base of the bead wire (between the points B0 and B1). This additional reinforcement then follows the profile of the bead wire covering 81 as far as its radially external part. At the point K, the tangent DK makes an angle of about 30° to a straight line D parallel to the axis of rotation. The point K is determined as the intersection of the additional reinforcement 5 with a plane perpendicular to the axis of rotation and passing through the radially outermost point B3 of the bead wire 7. Moreover, any additional reinforcement between a point K and its second end N2 is located substantially radially beneath the straight line DK. This condition means that the additional reinforcement follows, in the vicinity of the point K, a curve having a relatively small radius of curvature, that is to say less than the radius of a circle inscribed around the cross-section of the bead wire.

Furthermore, this structure includes a complementary stiffening reinforcement 6 formed from a plurality of metal cables inclined to the circumferential direction at a small angle (that is to say less than 45°). This complementary reinforcement lies axially to the inside of the carcass and is pressed against it except at its end where a profiled rubber element 610 splaying said end away from the carcass is provided in order to reduce the shear effects. This complementary reinforcement is wrapped around the bead wire in order to form an upturn 62 which follows the lateral face of the bead wire between B1 and B3 and then extends beyond the straight line D up to a radial distance Xe measured from the axis of rotation, which is substantially equal to the radial distance of the end N1 of the additional reinforcement 5 lying against the carcass. In the case shown, the ends of the complementary stiffening reinforcement 6 are located at distances (Xe, Xi) that are different so as not to create a region of stress concentration in operation.

Figure 6:
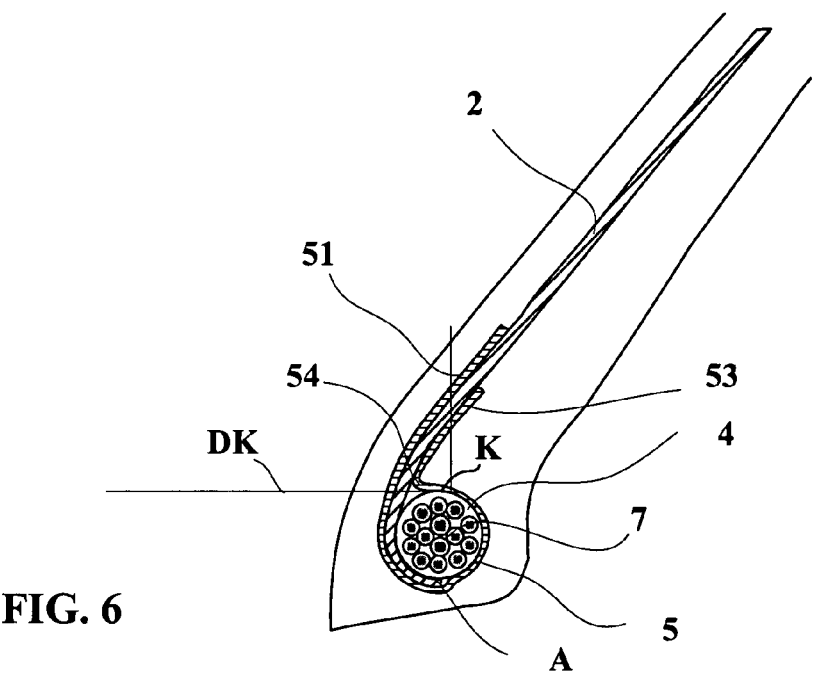
FIG. 6 shows yet another embodiment of a bead according to the invention, in which the bead wire is of substantially circular cross-section.

In another embodiment, shown in FIG. 6, a bead according to the invention comprises a metal carcass reinforcement 2 partially wrapped around a bead wire 7 of circular cross-section, the latter being covered in a profiled element 4 of rubber compound, in particular ensuring mechanical linkage between the carcass 2 and the bead wire 7. An additional coupling reinforcement 5 formed from a plurality of metal reinforcing members of low flexural rigidity (that is to say able to easily follow radii of curvature equal to or even less than the radius of the bead wire 4) is coupled to the carcass reinforcement over a part 53 and then extends so as to go around the bead wire core 8 beyond a point K obtained as the point of intersection with the profiled element 4 covering the bead wire and a straight line perpendicular to the axis of rotation passing through the radially outermost point of the bead wire. At the point K, the tangent to the profile of the additional reinforcement 5 is substantially parallel to the axis of rotation.

Advantageously, the additional coupling reinforcement 5 includes, beyond the point K and before the end part pressed against the carcass reinforcement, a region 54 of very small radius of curvature obtained by bending this reinforcement 5 (resulting in a plastic deformation of the metal reinforcing members of this reinforcement 5). This last embodiment may advantageously be combined with the complementary reinforcement provisions as described in the previous embodiments.

As a variant of the embodiments given in the present document, it may be advantageous for the additional coupling reinforcement to be continuous from one bead to the other: this variant reduces the number of reinforcement ends to two, these being located close to the bead wires or the carcass reinforcement, that is to say in regions that are not very sensitive to the flexural movements of the beads (it being understood that the carcass reinforcement lies axially to the inside of the bead wire and is partially wrapped around the bead wire while passing axially from the inside toward the outside).

In all the embodiments according to the invention it may be advantageous to make up the metal carcass reinforcement so that it includes a permanent plastic deformation located for example at the axially innermost point of the outline of the bead wire. This permanent deformation has the effect of improving the mechanical strength of the anchoring onto the bead wire and of improving the feasibility of the beads in manufacture. The term "permanent deformation" is understood here to mean a plastic deformation of the metal; this deformation may be carried out by bending or by using an appropriate tool in order to deform said carcass reinforcement by bending during production of the carcass reinforcement before manufacture of the tire. This same type of permanent deformation may also be envisioned on the additional coupling reinforcement at one or more points, provided that this reinforcement is made up of reinforcing members that can be permanently deformed.

Figure 4A:
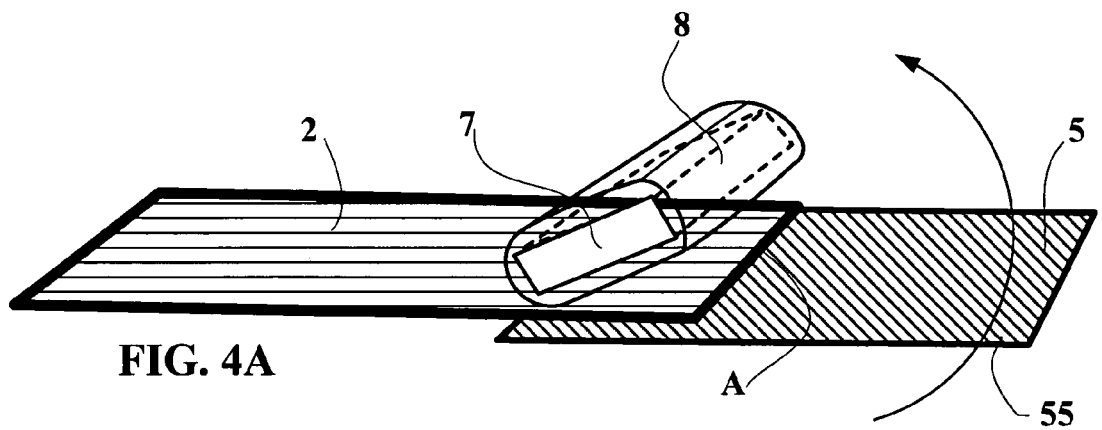
FIGS. 4A and 4B show two of the steps in the manufacture of a tire according to the invention.
Figure 4B:
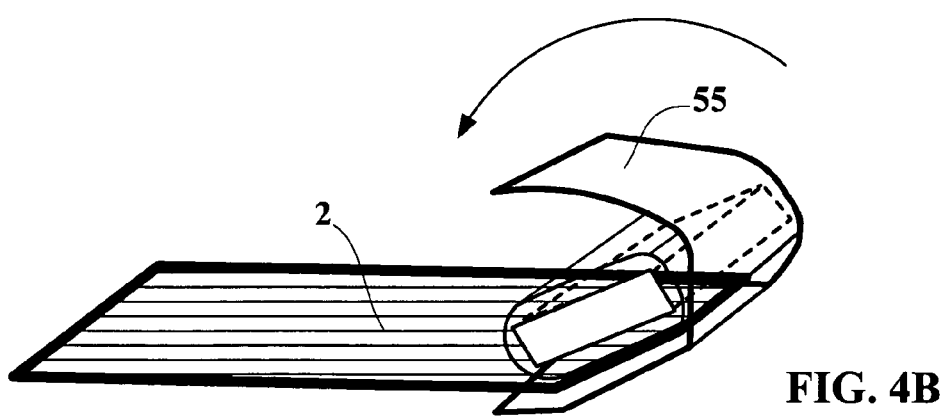

The process according to the invention is described with the support of FIGS. 4A and 4B. In a first step, first additional coupling plies 5 are placed on a manufacturing drum (not shown) so that they are axially a certain distance apart on said drum. Next, a carcass ply 2 is placed on this manufacturing drum in order to form a carcass reinforcement of a tire, said ply partly overlapping each additional coupling ply 5. Next, a bead wire core 8 made of a rubber compound reinforced with a bead wire 7, in the form of a ring, is inserted concentrically into the drum and axially close to each end A of the carcass ply.

In a following step (FIG. 4B), the axially external end 55 of each additional coupling ply 5 is turned up so as to make it wrap around the bead wire core 8 and press its end against the radially external face of said core. During this operation, the end of the carcass ply is pressed against the face 81 radially to the inside of the bead wire core 8. The next steps in making up the tire (which are not shown) consist firstly in making a toroidal shape by radially deforming the carcass ply, while bringing the bead wires axially closer together at the same time. Once this configuration is achieved, it is possible for example to attach a crown belt, giving the tire both circumferential and axial reinforcement, before being supplemented with all the usual profiled elements making up a tire. Once completed, this tire blank is introduced into a mold so as to fix the definitive shape of the tire and to vulcanize the various rubber compounds of which it is composed.

The same process may be implemented in order to produce any of the embodiments presented above.

The invention claimed is:

1. A tire comprising sidewalls joining a crown part to beads that are intended to come into contact with a mounting rim, these sidewalls comprising a carcass reinforcement comprising a plurality of reinforcing members placed at an angle of at least 70° to the circumferential direction, this carcass reinforcement being anchored in each bead to at least one bead wire and having an end A in each bead, the bead wire exhibiting essentially circumferential extensional rigidity and having, seen in meridian cross-section, an outer profile comprising two profile parts, a first part radially to the inside of axial width L, extending between an axially innermost point B2 and an axially outermost point B1, and a second part radially to the outside between said points B1 and B2, this bead wire being covered with at least one profiled element made of rubber compound in order to provide a mechanical link with the carcass reinforcement, this carcass reinforcement being partially wrapped around the bead wire going axially outward from the inside of the tire so that its end A is located axially between the end points B1 and B2 and radially to the inside of the radially internal first profile part of the bead wire, each bead comprising at least one additional coupling reinforcement in contact over a contact length D with the carcass reinforcement, said contact length D being measured starting from the end A of the carcass reinforcement, wherein the tire comprises, in each bead and seen in meridian cross-section—i.e. in a cross-sectional plane containing the axis of rotation:

said additional coupling reinforcement extends the carcass reinforcement so as to be at least partly wrapped around the bead wire, that is to say so as to at least partially cover the second part of the radially external profile of the bead wire between the end points B1 and B2, said additional coupling reinforcement having a trace such that the tangent DK to this trace, at a point K on said reinforcement, makes an angle of less than 45° to a straight line parallel to the axis of rotation, this point K being determined as the point of intersection between the trace of the additional reinforcement and a straight line passing through the radially outermost point of the bead wire profile and perpendicular to the axis of rotation.

2. The tire as claimed in claim 1, wherein the additional reinforcement is continued beyond the point K by an end part in contact with the profiled element covering the bead wire.

3. The tire as claimed in claim 2, wherein the additional reinforcement is entirely located radially below the tangent DK.

4. The tire as claimed in claim 2, wherein the part in contact with the profiled element covering the bead wire beyond the point K is extended by a part pressing against the carcass reinforcement, the tangent DK to the additional reinforcement cutting said additional reinforcement at a second point K'.

5. The tire as claimed in claim 1, wherein the contact length D between the carcass reinforcement and the additional coupling reinforcement is at least equal to the axial distance L separating the points B1 and B2 of the outer profile of the bead wire.

6. The tire as claimed in claim 1, wherein the width L of the internal face of the bead wire is at least equal to twice the height of said bead wire measured in the radial direction, said height corresponding to the maximum distance between points on said bead wire that are radially furthest apart, said points being taken along the same straight line perpendicular to the axis of rotation.

7. The tire as claimed in claim 1, wherein the carcass reinforcement is formed from a plurality of metal reinforcing members, each reinforcing member being formed from at least one thread with a diameter of 0.15 mm or higher and in that the additional coupling reinforcement is formed by at least one ply comprising a plurality of reinforcing members chosen in particular from the following reinforcing members: metal thread with a diameter of less than 0.15 mm, textile or aramid thread.

8. The tire as claimed in claim 1, wherein at least one bead further includes at least one complementary stiffening reinforcement, this complementary reinforcement comprising a plurality of reinforcing members making an angle of less than 45° to the circumferential direction.

9. The tire as claimed in claim 8, wherein the angle of the reinforcing members of the complementary stiffening reinforcement is close to 0°, that is to say at most equal to 10°, to the circumferential direction and in that the length of these reinforcing members is less than the perimeter of the circle of diameter DJ equal to the nominal diameter of the mounting rim.

10. The tire as claimed in claim 1, wherein the additional coupling reinforcement is continuous from one bead to the other.

11. The tire as claimed in claim 1, wherein the reinforcing members of the carcass reinforcement include at least one permanent deformation located at the axially and radially innermost point of the bead wire.

12. A process for manufacturing a tire having a carcass reinforcement comprising a plurality of radially oriented reinforcing members, the ends of which are anchored in each bead to a bead wire core comprising a bead wire essentially exhibiting circumferential extensional rigidity and having, seen in meridian cross-section, a profile comprising two profile parts, a first part radially to the inside of axial width L, extending between an axially innermost point B2 on the outline of the bead wire and an axially outermost point B1 on the same outline, and a second part radially to the outside between said points B1 and B2, each bead further including at least one additional coupling reinforcement having ends N1 and N2, this additional coupling reinforcement being in contact over a length D with the carcass reinforcement, said length D being measured starting from the end A of the carcass reinforcement, wherein the process comprises the steps of:

two coupling reinforcements axially spaced apart are placed on a manufacturing drum, these coupling reinforcements being of appropriate bending stiffness so as to allow them to be turned up around a bead wire core;

a carcass reinforcement is deposited on the same manufacturing drum, so that each end of said carcass reinforcement partly covers each of the coupling reinforcements;

a bead wire core is positioned in each bead, said core being formed from a bead wire covered in a rubber-based material, concentrically with respect to the manufacturing drum and radially to the outside of each end of the carcass reinforcement, so that each of the ends of this reinforcement lies axially between the points B1, B2 of the radially internal profile part of the bead wire;

each of the coupling reinforcements is turned up around the bead wire core so that each coupling reinforcement end lies between the points B1, B2 of the radially external profile part of the bead wire;

the process continues in the usual manner for manufacturing the tire, by converting the shape of the drum into a toroidal shape and then by placing the other components of the tire thereon in order to form a tire blank; and this tire blank is molded and vulcanized.

* * * * *